United States Patent [19]

Wernitz

[11] 3,799,281
[45] Mar. 26, 1974

[54] DEVICE FOR ELECTROMECHANICALLY WEIGHING

[75] Inventor: Peter Wernitz, Aachen, Germany

[73] Assignee: Dr. Hans Boekels & Co., Aachen, Germany

[22] Filed: Nov. 8, 1972

[21] Appl. No.: 304,737

[52] U.S. Cl.............. 177/210, 177/212, 177/229, 177/DIG. 9
[51] Int. Cl........ G01g 3/14, G01g 7/00, G01g 3/08
[58] Field of Search .......... 177/164, 210, 212, 229, 177/255, DIG. 9

[56] References Cited
UNITED STATES PATENTS

| | | | |
|---|---|---|---|
| 3,519,095 | 7/1970 | Tomes | 177/212 X |
| 3,142,349 | 7/1964 | Blodgett | 177/229 X |
| 2,649,294 | 8/1953 | Walter | 177/229 |
| 3,078,936 | 2/1963 | Thomson | 177/210 |
| 3,288,231 | 11/1966 | Hanne | 177/229 X |
| 3,604,525 | 9/1971 | Blethen et al. | 177/212 X |
| 3,677,357 | 7/1972 | Baumgartner | 177/212 X |

Primary Examiner—George H. Miller, Jr.
Attorney, Agent, or Firm—Walter Becker

[57] ABSTRACT

A device for electromechanically weighing, which comprises a support movably guided relative to a stationary frame in a predetermined direction and acted upon by a weight while a generator of a magnetic field of a known strength is connected to said support, said generator being located within the region of a further stationary generator of a magnetic field of a likewise known strength. These generators are arranged relative to each other in such a way that a force acting counter to the effect of the weight is ascertained upon the support. There is furthermore provided a contact-free sensing device for converting the position of the support relative to the frame into electrical values while a control device is connected to the sensing device for controlling the strength of the magnetic field at least of one of said generators in such a way that the support is held in a predetermined position, a device being provided for indicating and/or further evaluating the strength of the controlled magnetic field or fields or a value of another physical value proportional to said strength.

4 Claims, 6 Drawing Figures

DEVICE FOR ELECTROMECHANICALLY WEIGHING

The present invention relates to a device for electromechanically weighing. Various devices of this type have become known. The ascertainment of a weight is always effected by converting a mechanical value into an electrical value. The weight to be ascertained is countered by a spring or a counterweight through the intervention of an interposed mechanical system. All of such mechanical systems have a disadvantageous effect upon the swinging-on behavior of such weighing device in view of the unavoidable mass of the individual elements of such systems. Furthermore, the friction occurring in the bearing means for the levers and the like of such systems affect the weighing precision. In addition thereto, changes in temperature bring about changes in the dimensions in the elements of such systems. The faulty weighing resulting therefrom can be reduced only by expensive compensation methods.

It is, therefore, an object of the present invention to provide a device for electromechanically weighing which will improve the weighing precision of electromechanical weighing devices and will avoid mechanically caused influences leading to faulty weighing.

It is another object of this invention to provide a device for electromechanically weighing which will simplify the mechanical system.

These and other objects and advantages of the invention will appear more clearly from the following specification, in connection with the accompanying drawings, in which.

Figure 1:
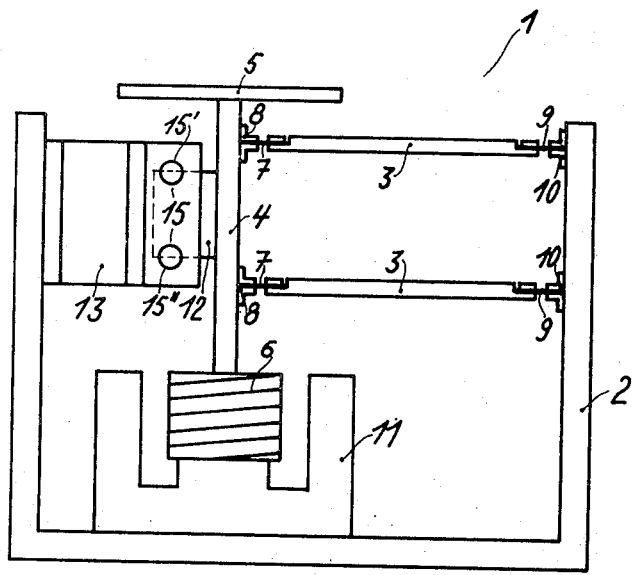
FIG. 1 illustrates a side view and section of a device according to the invention.
Figure 2:
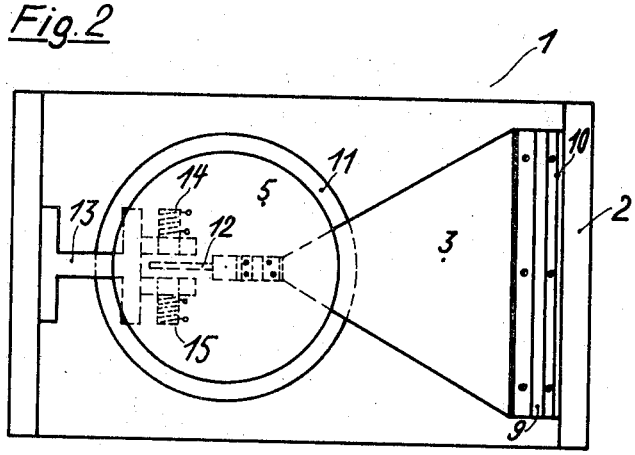
FIG. 2 shows a top view of the device of FIG. 1.

The device according to the present invention for electromechanical weighing is characterized primarily by a support which is movably guided relative to a stationary frame in a predetermined direction and is acted upon by a weight while a generator of a magnetic field of a known strength is connected to said support, said generator being located within the region of a further stationary generator of a magnetic field of a likewise known strength. These generators are arranged relative to each other in such a way that a force acting counter to the effect of the weight is exerted upon the support. The invention is furthermore characterized by a contact-free feeling or sensing device for converting the position of the support relative to the frame into electrical values. In addition thereto, the invention is characterized by a control device connected to the sensing device for controlling the strength of the magnetic field at least of one of said generators in such a way that the support is held in a predetermined position, a device being provided for indicating and/or further evaluating the strength of the controlled magnetic field or fields, or a value of another physical value proportional to said strength.

The present invention points a way, by introducing a direct electromagnetic force compensation, to avoid mechanically fault-causing influences. The weighing device according to the present invention need no forced deviating means operating through levers and bearings and operates without springs thereby avoiding the drawbacks inherent to such structural elements. The current necessary for compensating the weight or the magnetic field generated by said current serves as measurement for the weight of the mass. The weighing device according to the invention therefore has only few masses of the individual elements of the mechanical system and in view of this particular construction has a very satisfactory swinging-on behavior.

According to a preferred embodiment of the invention, the support is, through parallel linkage elements, located in a plane which is parallel to the direction of the forces acting upon the support, connected to the frame. Furthermore, to one end of the support there is connected a weighing plate whereas to the other end of said support is connected a generator of a magnetic field which extends into the range of operation of a second generator connected to the frame for generating another magnetic field. Moreover, the support is provided with a marking, or the like, which is located within the range of operation of the sensing device provided on the frame.

According to a further development of this embodiment, it is suggested that the joints of the linkage means on the side of the support and the frame are formed by metal strips, or the like, which at both ends are firmly clamped and are bendable in the direction of the effective forces. These metal strips have a high resistance moment in the direction transverse to the plane of the linkage means. This construction has the advantage that from the frame or from the linkage means no material forces can act upon the support so that the measuring or weighing results will not be affected by the guiding of the support.

In order to design the guiding means for the support transverse to the direction of the forces emanating from the weights, as rigidly as possible while nevertheless keeping the said guiding means as light as possible, it is furthermore suggested to design the linkage elements in the form of equal-sided trapezoids and to connect the support with those edges of the linkage means which form the smaller base lines of the trapezoids.

In order to subject the movably guided support to as small a load as possible, it is expedient according to another feature of the invention to design the generator of one magnetic field as coil connected to the support, which coil is connected with the control device for feeding a controlled current to the coil, a further additional stationary generator of a magnetic field being provided in the form of a permanent magnet. Numerous standard electric or electronic auxiliary means are available for generating the current to be fed to the coil.

According to a preferred embodiment of the electric or electronic portion of the device according to the invention, the feeling or sensing device comprises two coil systems only slightly spaced from each other with each having two interconnected coils. These coil systems are geometrically associated with each other in such a way that the axes of one coil each of both coil systems are in alignment with each other, while the marking on the support is formed by a screening plate, the length of which corresponds to the spacing of the axes of the coils of one and the same spool system. One of the spool systems is connected to the oscillator whereas the other spool system is connected to a differential rectifier. The exit of the differential rectifier is connected to an amplifier the exit of which is located at the inlet of a voltage-current transformer which at a voltage at the outlet of the differential rectifier conveys to the coil on the support a current corresponding to the respective weight to be ascertained.

In order to protect the support and the coil connected thereto to against possible damage, abutments are provided for limiting the movement of the support.

Instead of the above mentioned and suggested embodiment of the invention, both generators of magnetic fields may be formed by coils. These coils may, for instance, be arranged in series so that the magnitudes of the magnetic fields of both coils are precisely known in view of the same current flow. Instead of air coils, also electromagnets may be employed.

Referring now to the drawings in detail, the device generally designated 1 of the present invention comprises primarily a frame 2 having connected thereto a support 4 by means of linkage elements 3. The linkage elements 3 have the form of equal sided trapezoids. Those edges of the linkage means which form the smaller base sides of the trapezoids are connected to bearings 8 on the support 4 by means of flexible metal strips, or the like 7. Those edges of the linkage means 3 which form the larger base sides of the trapezoids are connected to bearings 10 on frame 2 by means of metal strips, or the like 9. For purposes of receiving the load or weight to be ascertained, a weighing plate 5 is arranged at one end of the support 4. On that side of the support 4 which is located opposite the weighing plate 5, an electric coil 6 is connected to the weighing plate 5. The connections of coil 6 are only indicated but are not designated more specifically. The hollow coil 6 is to the greater extend located above the central portion of a magnet 11 which has a substantially M-shaped cross section. Furthermore, a shielding or screening plate 12 is located in the gap between the coil systems 14 and 15. The length of the shielding plate 12 is so dimensioned that the width of said gap corresponds to the spacing between the axes of the coils of each coil system.

Figure 3:
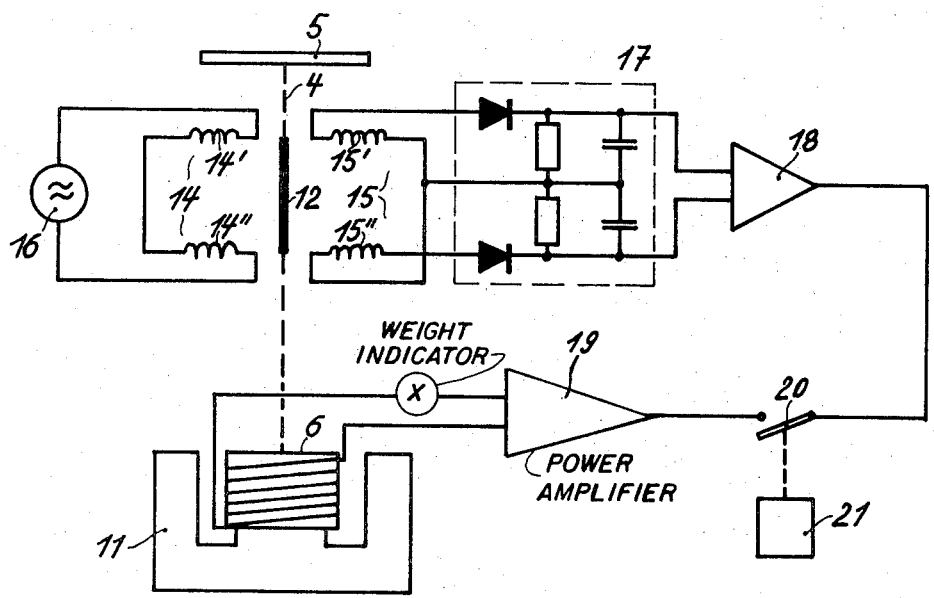
FIG. 3 illustrates a possible electric control arrangement for generating the current which is to be conveyed to a coil connected to a support.
Figure 4:
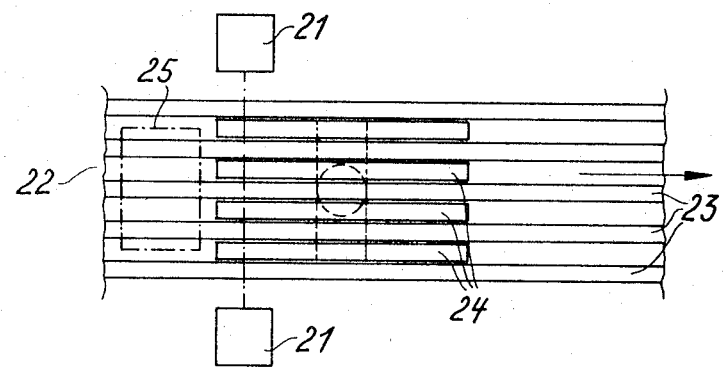
FIG. 4 shows a top view of a comb-like weighing table together with a portion of a conveyor member composed of a plurality of belts.
Figure 5:
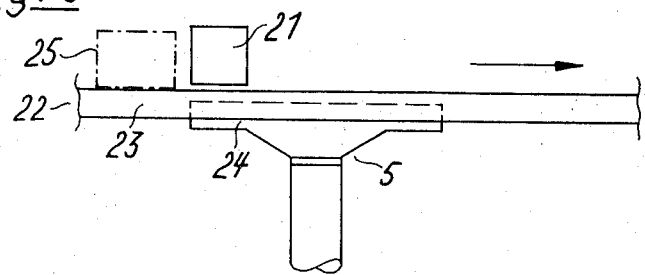
FIG. 5 illustrates a side view of the weighing table of FIG. 4 in lowered condition.

FIG. 3 shows an oscillator 16 which is connected to the coils 14' and 14" of the coil system 14. The weighing plate 5 and the support 4 are shown only diagrammatically. The shielding plate 12 connected to the support 4 is in the starting position of the support located so-to-speak in the range of action of the coils 14' and 15' and also of the coils 14" and 15" of the coil systems 14 and 15. The coils 15' and 15" are connected to a differential rectifier 17, the individual structural elements of which have not been designated more specifically. The exit of the differential rectifier 17 is connected to the inlet of an amplifier 18, the exit of which is located at the inlet of a voltage and current transformer. Coil 6 is connected to the exit of the voltage-current transformer 19.

The operation of the circuit illustrated in FIG. 3 is as follows: The oscillator 16 induces electric voltages in the coils 15' and 15" of the coil system 15 by means of the coils 14' and 14" of the coil system 14. The support 14 or shielding plate 12 occupies such a position with regard to the position of the coils 14' and 15' and 14" and 15", in which by means of the amplifier 18 and the voltage-current transformer 19 as well as coil 6 such force acts between the magnetic fields of coil 6 and the magnets 11 opposing each other that the tare weight or dead weight made up of the weight of the support 4, of the weighing plate, and the coil 6 will just be compensated for.

When the weighing plate is under the load of a weight, the weighing plate 5 will together with the support 4 and the shielding plate 12 slightly move downwardly. As a result thereof, a higher voltage will be induced in coil 15' and a lower voltage will be induced in coil 15" than the voltage in the starting position of the support 4. This results in a corresponding change in voltage at the outlet of the differential rectifier 17. The amplifier 18 connected to the outlet of the differential rectifier 17 furnishes a corresponding voltage to the voltage transformer 19. This transformer transforms the applied voltage into a current which is proportional to this voltage and which is conveyed to the coil 6 connected to the support 4. This current brings about an increase in the force exerted from the coil 6 upon the support 4 in the sense of a compensation of the weight on the weighing plate 5. As long as the balance between the total from said tare weight and the weight to be ascertained and the magnetic counter force has not been reached, it will, due to the voltage at the differential rectifier 17, bring about a corresponding increase in the current which passes through the coil 6. Only when a balance between the total weight and the magnetic counterweight has been realized, will the current no longer be increased further in the coil. The current passing through the coil 6 is a measurement for the weight which acts upon the weighing plate 5 and which has to be ascertained.

In this connection, it should be mentioned that the required mechanical structural elements have only a short minor influence upon this type of ascertaining the measuring value. While avoiding the disadvantageous influences encountered with mechanical structural elements of heretofore known devices of the type involved, the force emanating from a weight to be ascertained is compensated for by an equally great force without deviations of the power flow and acting in the same axis upon the weighing surface.

Figure 6:
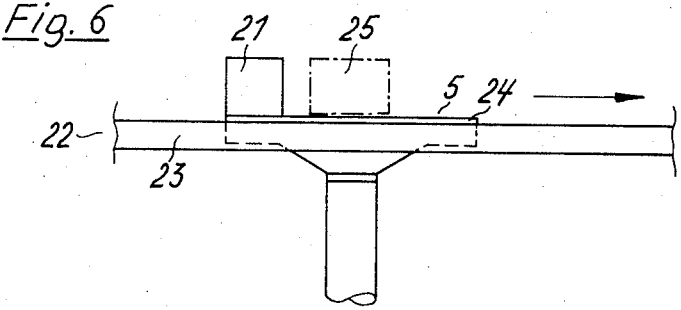
FIG. 6 shows a side view of a weighing table of FIG. 4 in lifted condition.

The device according to the present invention makes it possible by closing or opening of the circuit between the amplifier 18 and the coil 6 in a very simple manner to lift or lower the weighing table. It is for this reason that the device is particularly suitable for dynamic weighing operations according to which the parts 25 to be weighed are in motion. For instance, the parts 25 to be weighed may at a sufficient distance from each other be conveyed upon a conveyor or conveyor belt 22, and during the conveying operation may by lifting the weighing table 5 — closing the circuit between amplifier 18 and coil 6 — be weighed beyond the level of the conveyor belt 22 (FIG. 6). To this end, for instance, the conveyor belt 22 may consist of a plurality of individual bands 23 of a lesser width between which comb-like elements 24 of the weighing table 5 can be moved upwardly and downwardly so that the elements of the weighing table in weighing position will be located above the level of the band or bands 23 and are under the load of the weight of the parts 25, the individual bands 23 being arranged in spaced relationship to each other. In this way, measurements are not influenced by the conveyor belt. However, it is also possible to have the conveyor belt pass over the weighing table and to carry out weighing operations. However, in such an instance special steps have to be taken in order to avoid falsifications of the measuring results by the oscillations, or the like, which are conveyed from the conveyor belt to the weighing table.

As illustrated in FIGS. 3-6, for purposes of lifting of the weighing table with the support there may be provided, for instance, a sensing device 21 which senses the conveyor belt as to the presence of parts 25 to be weighed. This sensing device 21 actuates swithces 20 located in the circuit between amplifier 18 and coil 6. The sensing device 21 may operate photoelectrically. When the switch 20 is in its open position, the weighing table 5 is lowered, whereas as in the closing position of switch 20, the weighing table 5 occupies its weighing position. FIG. 3 shows a weight indicator and a tension current converter purposely designated as an output amplifier means 19. This weight indicator and power amplifier are arranged in series with the current circuit of the coil 6 thereby to serve as a weight indicator for the current flowing at a particular time.

It is, of course, to be understood that the present invention is, by no means, limited by the particular showing in the drawings, but also comprises any modifications within the scope of the appended claims.

What I claim is:

1. A device for electromechanically weighing which includes a support, a stationary frame, said support being operable by a weight and being adapted to be moved and guided relative to said frame in a predetermined direction, a first generator of a magnetic field of a desired strength connected to said support, a second generator for generating a magnetic field of a desired strength, said first generator being arranged within the region of said second generator, and both generators being aligned with regard to each other so that a force is exerted upon the support which acts counter to a weight acting upon said support, a contact-free operating sensing device for translating the position of said support relative to said frame into electric values, a control device operatively connected to said sensing device for controlling the strength of the magnetic field of at least one of said generators so that the support is held in a predetermined position, and indicating means for indicating the strength of at least one of said magnetic fields, link means parallel to each other and located in a plane parallel to the direction of the forces acting upon said support, said link means connecting said support to said frame, a weighing plate arranged at one end of said support, a generator for a magnetic field connected to the other end of said support, a further generator of a magnetic field arranged within the region of action of a further generator of a magnetic field which is connected to said frame, and marking means provided on said support and arranged within the region of the sensing device connected to the frame, the sensing device comprising two coil systems with two coils each connected to each other, said two coil systems being arranged with a slight gap therebetween and being located on said frame, said coil systems being geometrically coordinated to each other in such a way that the axes of one coil each of both coil systems are axially aligned to each other, said marking means arranged on said support forming a shielding plate, the length of which corresponds to the distance between the axes of the coils pertaining to one and the same coil system, oscillator means connected to one of said coil systems, differential rectifier means connected to the other coil system, amplifier means connected to the exit of said differential rectifier means, voltage-current transformer means having an inlet connected to the outlet of said amplifier means, said voltage-current transformer means being adapted at the voltage at the exit of the differential rectifier means to convey to the coil connected to said support a current corresponding to the weight on said support.

2. A device according to claim 1, in which the link means are arranged on the side of the support and the side of joints of the link means on the side of the frame, said link means being formed by clamped-in flexible metal strips clamped-in at both ends and having a high resistance moment in the direction transverse to the plane of the link means.

3. A device according to claim 2, in which the link means have the form of equal-sided trapezoids, and in which the support is connected to those edges of the link means which form the smaller base line of the trapezoids.

4. A device according to claim 1, which includes control means provided in a circuit between said amplifier means and the coil connected to said support for purposes of lowering and lifting said support and the weighing plate.

* * * * *